United States Patent [19]
Gilmore

[11] Patent Number: 5,032,051
[45] Date of Patent: Jul. 16, 1991

[54] MILLING MACHINE IMPROVEMENT

[76] Inventor: Guy T. Gilmore, 1823 Wildcat La., Crosby, Tex. 77532

[21] Appl. No.: 481,517

[22] Filed: Feb. 20, 1990

[51] Int. Cl.⁵ .................. B23C 1/20; B27G 23/00
[52] U.S. Cl. ....................... 409/175; 33/293;
  33/642; 51/241.5
[58] Field of Search ............ 409/175, 178, 218, 235;
  51/165.74, 165.72, 241.5; 33/626, 628, 638, 642,
  707, 293, 533, 334, 451; 356/375, 388

[56] References Cited

U.S. PATENT DOCUMENTS

| | | | |
|---|---|---|---|
| 3,596,558 | 8/1971 | Rydell | 409/178 |
| 3,763,570 | 10/1973 | Andersen | 33/642 X |
| 3,940,858 | 3/1976 | Perrotti et al. | 33/293 X |
| 4,022,106 | 5/1977 | Kile | 409/178 |
| 4,406,069 | 9/1983 | Clement | 33/642 |
| 4,777,707 | 10/1988 | Kirscher | 409/178 X |
| 4,818,160 | 4/1989 | Rabe et al. | 409/235 |
| 4,879,815 | 11/1989 | Vischer | 33/293 |

FOREIGN PATENT DOCUMENTS

| | | | |
|---|---|---|---|
| 240802 | 10/1987 | European Pat. Off. | 33/643 |
| 525136 | 6/1929 | Fed. Rep. of Germany | 33/370 |
| 255694 | 4/1988 | German Democratic Rep. | 33/626 |
| 147417 | 5/1961 | U.S.S.R. | 409/178 |
| 697263 | 11/1979 | U.S.S.R. | 409/178 |

Primary Examiner—William Briggs
Attorney, Agent, or Firm—James A. Bargfrede

[57] ABSTRACT

A portable milling machine is provided for solving in-place machining problems encountered on turbines, pumps, electric motor bases, and other types of field equipment requiring a close tolerance, machined surface prior to installation. Such portable milling machine is set up at a job-site using a plurality of levels in conjunction with an optical leveling kit and a vertical scale magnetically mounted at selective locations on such portable milling machine during set-up. The set-up time for such portable milling machine substantially is cut in half by using levels in conjunction with optics and accuracy may be achieved within 0.001 to 0.002 of an inch.

1 Claim, 6 Drawing Sheets

MILLING MACHINE IMPROVEMENT

BACKGROUND OF THE INVENTION

I. Field of the Invention.

This invention relates to equipment used in machining material such as metal.

II. Description of related art including information disclosed under §§ 1.97-1.99.

Related art includes the aircraft industry, and optics.

SUMMARY OF THE INVENTION

A portable milling machine utilizing a plurality of levels is provided for machining pump bases and centrifuges. Such portable milling machine also utilizes optics for positioning such machine in combination with the plurality of levels thereby allowing the set-up time to be substantially cut in half. An optical alignment kit is positioned about ten feet from the portable milling machine and determines the amount of material which has been removed by the portable milling machine and also provides level indication. Three motors are used as part of the portable milling machine for positioning such machine along the conventional x, y, and z axes.

DESCRIPTION OF THE PREFERRED EMBODIMENTS

Figure 1:
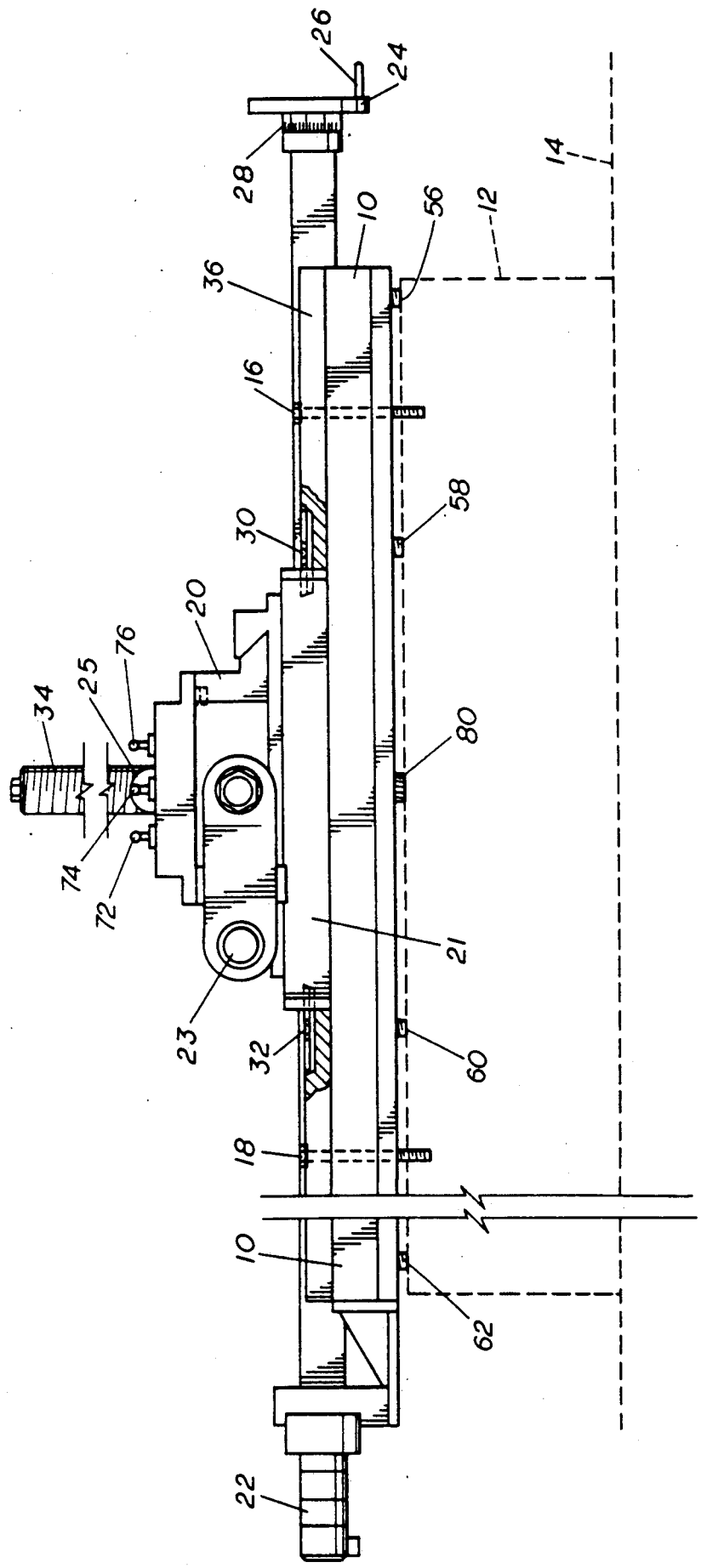
FIG. 1 is a back, elevational view of the portable milling machine of the present invention.

FIG. 1 is a back, elevational view of the portable milling machine of the present invention. Base 10 is positioned on a support 12 which may be on the ground 14. The milling machine may be of a type well known in the art in which rotation of a tool removes metal from a workpiece which is to be machined and finished for any one of a number of possible purposes.

Base 10 is connected to support 12 through a plurality of bolts such as bolt 16 and bolt 18 which provide positioning of the milling machine near the workpiece to be machined. A bed 20 is positioned on the main carriage 21 and moves parallel to the main carriage 21. Horizontal feed air motor 22 extends horizontally and is connected to wheel 24 having a handle 26 with a vernier 28 to measure and set the amount of material to be machined from the workpiece. Similarly, perpendicular feed air motor 23 is used for positioning the bed 20 in a plane perpendicular to that of the horizontal feed motor 22. Air motor 25 provides power for rotating spindle 34 which has a manual feed. Thus, adjustment of the portable milling machine can be attained along each of the conventional x, y, and z axes.

A plurality of levels such as level 30 and level 32 contribute to the proper positioning of the portable milling machine at the worksite.

As pointed out previously, the basic operation of the portable milling machine of the present invention insofar as removal of material from a workpiece is concerned is well known and the improvement which has been provided by the present invention lies in the portable, economical, accurate, and fast set-up time on a work piece.

Figure 2:
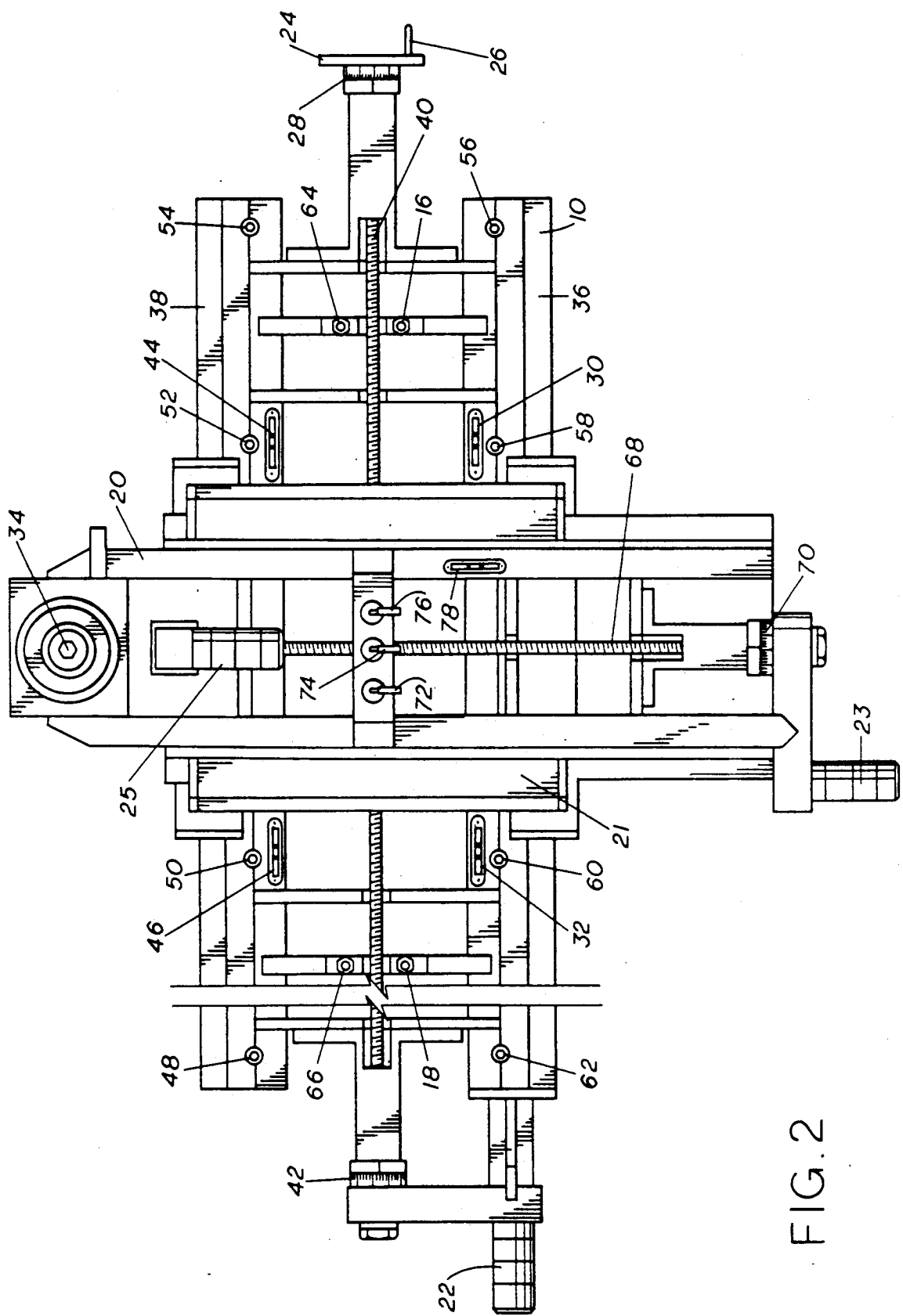
FIG. 2 is an upper, plan view of the portable milling machine shown in FIG. 1.

FIG. 2 is a top, plan view of the portable milling machine shown in FIG. 1. Base 10 essentially is in two parallel sections, one section being member 36 and the other section being member 38. Rotation of wheel 24 having handle 26 allows setting with vernier 28. Feed screw 40 extends between member 36 and member 38 to vernier 42 at the other end of the base 10 having horizontal feed motor 22.

As pointed out previously, a plurality of known levels having a bubble therein are positioned on base 10. Level 30 and level 32 are positioned along member 36 to allow proper leveling of the base 10. Such leveling is accomplished by adjustment of set screw 48, 50, 52, 54, 58, 60, 62, 63, and 65. These set screws may have a socket head which will allow rapid rotation for fast and accurate positioning.

Bolt 16 and bolt 18 along with bolt 64 and bolt 66 allow fixed positioning of the portable milling machine on a support at the work location. Jackscrews well known in the art may be used for initial positioning of the portable milling machine.

Positioned perpendicularly to the base 10 is bed 20 having a spindle 34 extending perpendicularly from bed 20. Feed screw 68 causes movement of bed 20 in a perpendicular direction to base 10 and vernier 70 provides a reading of the material to be removed from the workpiece.

Valves 72, 74, and 76 control air motors 22, 23, and 25 for providing power to the portable milling machine.

Thus it will be appreciated in viewing FIG. 2 that the portable milling machine may be accurately positioned through the use of levels 30, 32, 44, and 46 along with level 78 which is positioned perpendicularly to the aforementioned levels. The use of levels as shown and described provides an easy, safe, economical, and accurate method of positioning the portable milling machine on the workpiece and represents a significant improvement over the prior art. The bed of the portable milling machine is flexible and provides zero tolerance where required to assure that bearings and couplings will not fail on machinery positioned after milling has been done by such portable milling machine.

Figure 3:
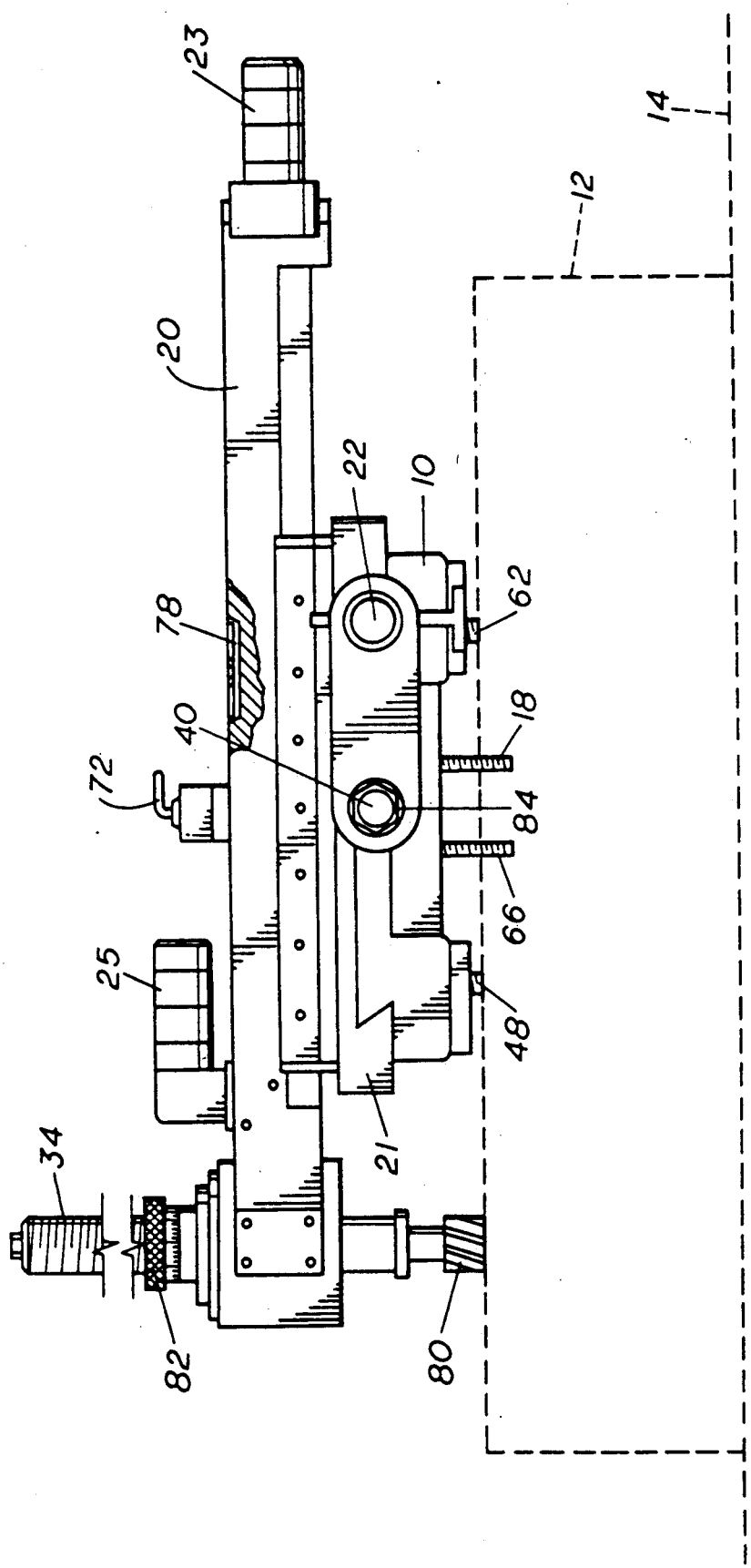
FIG. 3 is a side, elevational view of the portable milling machine of the present invention.

FIG. 3 is a side, elevational view of the portable milling machine of the present invention. Support 12 has base 10 attached with bolt 18 and bolt 66. Perpendicular feed air motor 23, as explained previously, is used to move the bed 20 in a plane parallel to the support 12. Air motor 25, as explained previously, is utilized for rotating cutter 80 which is attached to spindle 34. A knurl, calibrated hand feed nut 82 is positioned on spindle 34 so that cutter 80 may be fed into the workpiece manually.

Horizontal feed air motor 22 is utilized for movement of the milling machine as explained previously. Nut 84 holds the feed drive unit in place. Set screws 48 and 62 which are visible in FIG. 3 are utilized to level the milling machine of the present invention as explained previously. In this connection, level 78 is shown in FIG.

3 as explained previously. Also visible in FIG. 3 is valve 72 which connects to an air source such as a compressed air tank or similar pneumatic system.

Figure 4:
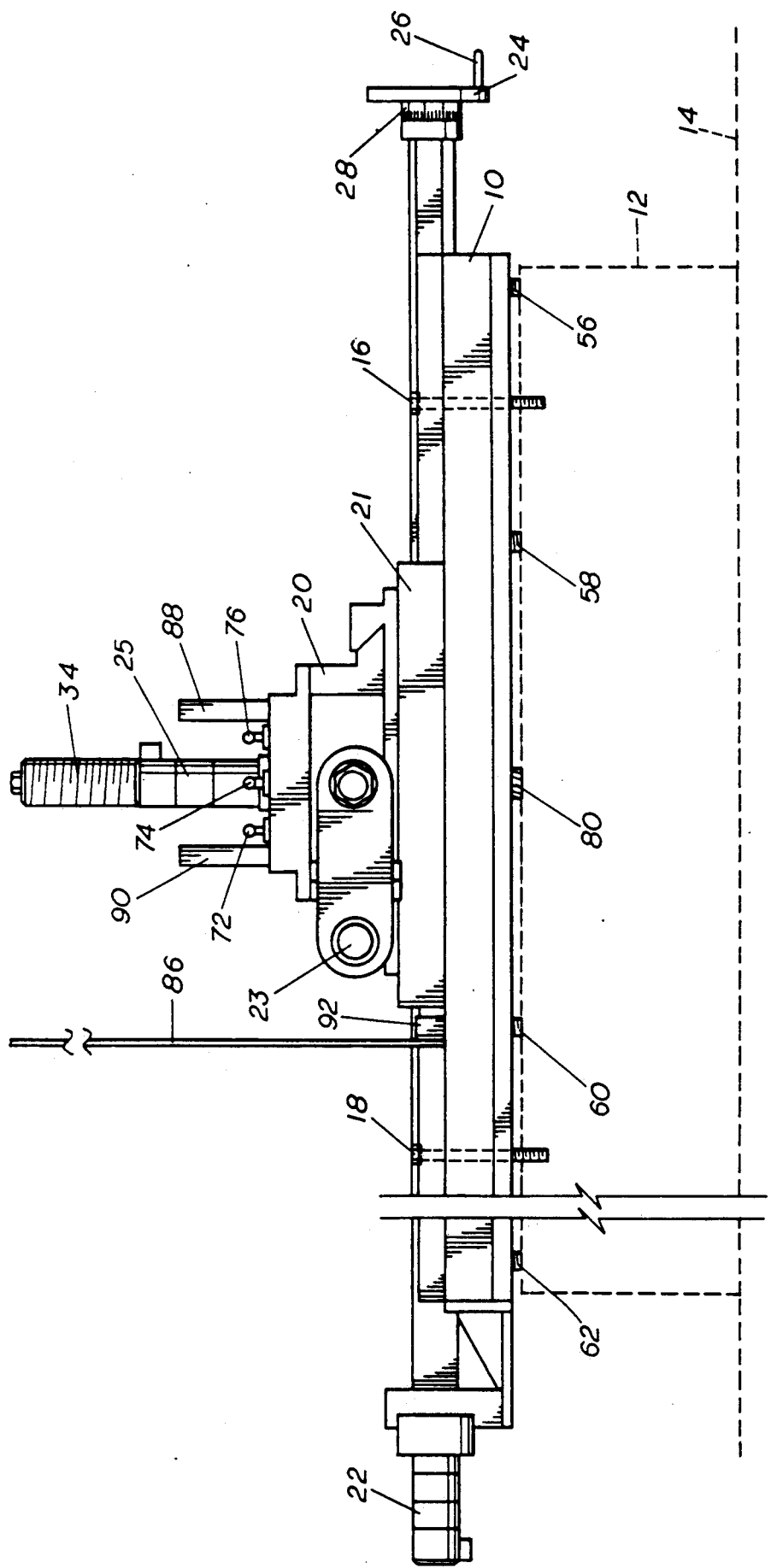
FIG. 4 is a back, elevational view of the portable milling machine of the present invention showing a measurement rod.

FIG. 4 is a back, elevational view of the portable milling machine of the present invention showing a measurement rod positioned with a magnet, for example. The components of the portable milling machine of the present invention identified in FIG. 1 are the same in FIG. 4 with measurement rod 86 positioned in a vertical plane to allow optic positioning of the portable milling machine of the present invention by utilizing, for example, a known Keuffel & Esser Co. optical alignment kit for accurate, simple positioning of the portable milling machine of the present invention. The optical alignment equipment is well-known in the art and the utilization of such equipment is not deemed to be necessary or required in the explanation of the present invention, particularly in view of the prior reference to a specific manufacturer.

The readings or the calibrations on measuring rod 86 may be of any suitable and desired spacing to allow close-tolerance machining in accordance with the teaching of the present invention.

Figure 5:
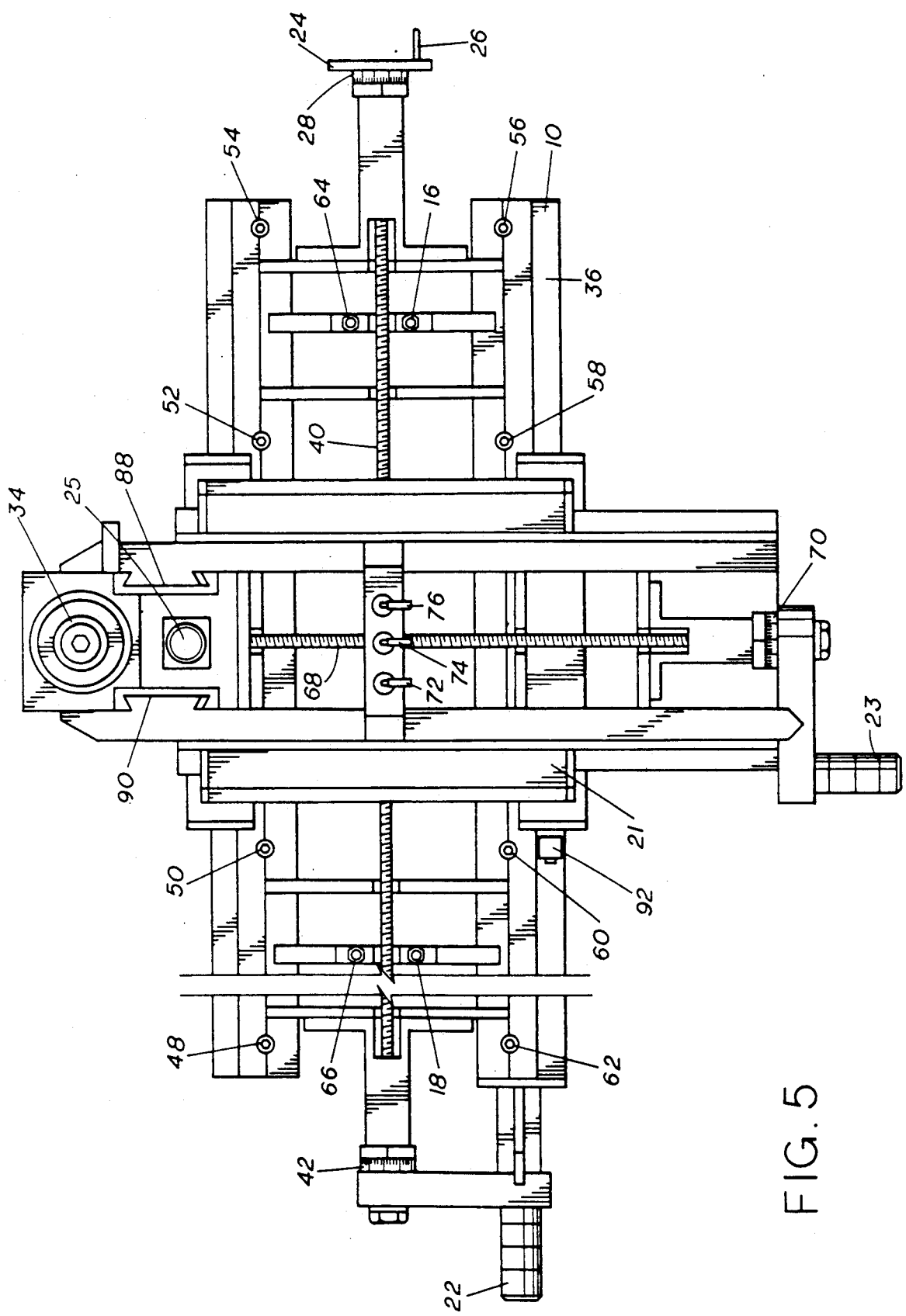
FIG. 5 is an upper, plan view of the portable milling machine of the present invention.

FIG. 5 is an upper, plan view of the portable milling machine of the present invention. FIG. 5 is similar to FIG. 2 except that dove-tail 88 and dove-tail 90 are visible and allow use of the portable milling machine of the present invention in locations where there is limited vertical clearance. It will be appreciated that dove-tail 88 and 90 provide guidance for the vertical movement of the portable milling machine of the present invention. The components shown in FIG. 5 are substantially the same as those shown in FIG. 2 and have reference numerals common to those of the same components of FIG. 2.

Figure 6:
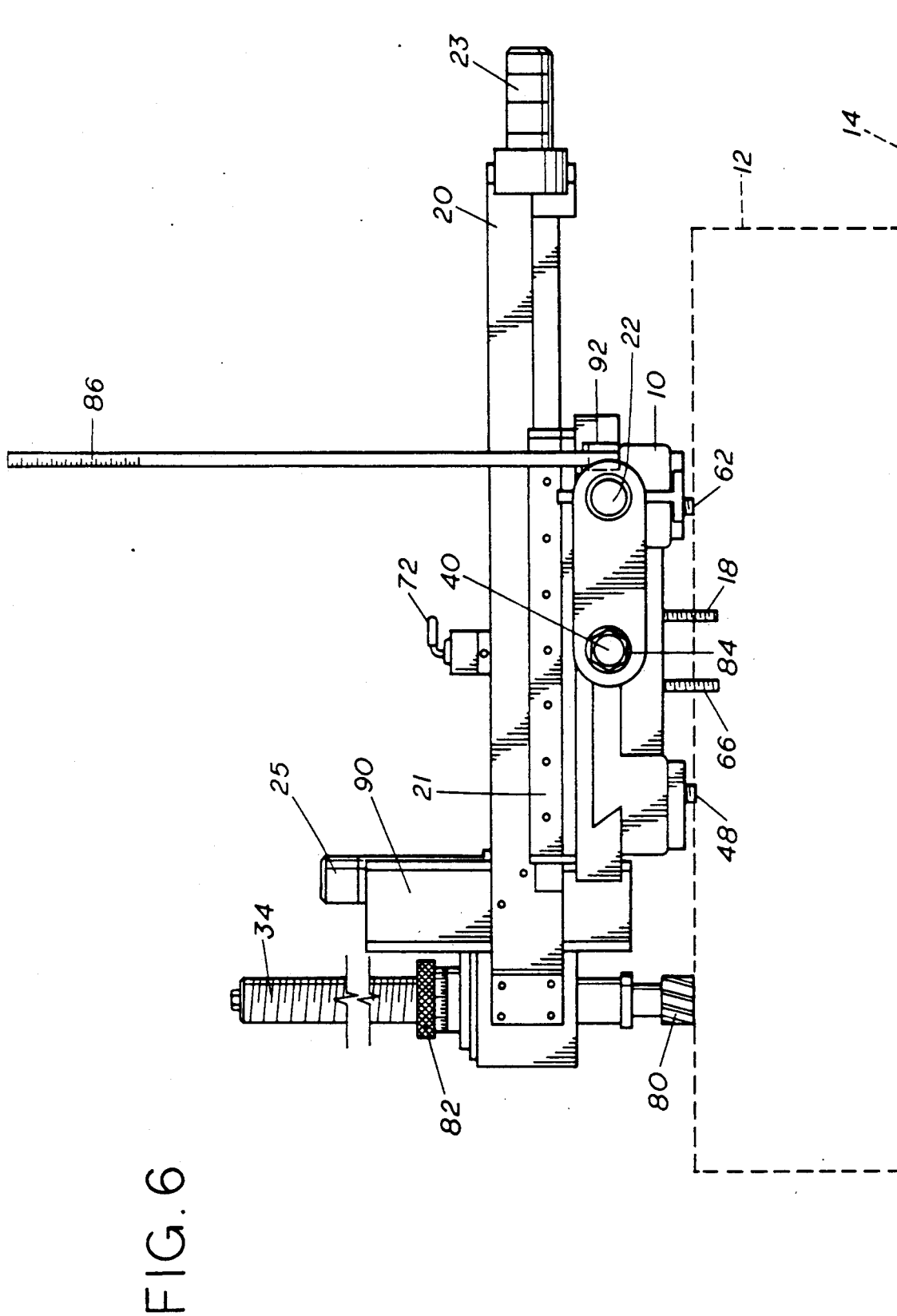
FIG. 6 is a side, elevational view of the portable milling machine of the present invention showing a measurement rod positioned on such portable milling machine.

FIG. 6 is a side, elevational view of the portable milling machine of the present invention showing a measurement rod positioned with magnet 92 on such portable milling machine. FIG. 6 is similar to FIG. 3 with the exception of the showing of the measurement rod 86 having calibration marks only in the upper portion of such measurement rod. The components shown in FIG. 6 have been identified previously in connection with the explanation of FIG. 3.

Thus it will be appreciated that the present invention provides a portable milling machine capable of doing close tolerance machining while requiring minimal set-up time. The cost savings and reliability of the present invention are unobvious and have led to improvement in machining in ordinarily inaccessible locations while providing zero tolerance when necessary.

Although preferred embodiments of the invention have been shown and described in accordance with the requirements of the United States Patent Laws, it will be appreciated by those skilled in the art to which the present invention pertains that many modifications and improvements may be made without departing from the spirit of the invention defined by the claims.

I claim:

1. A portable milling machine adapted for field use, wherein zero tolerance may be provided on the workpiece and the height of space necessary for operation of such machine may be as small as twelve inches, said portable milling machine including in combination a base, bed means including first and second level means positioned in a horizontal plane perpendicular to each other on said base, and a plurality of motor feeds adapted for positioning said bed means along each of the conventional x, y, and z axes, cutting means connected to said bed means for material removal from said workpiece, and optic means including a substantially vertical rod having elevation markings and positioned on said bed means for positioning said bed means during set-up and during machining operations.

* * * * *